United States Patent Office 3,295,391
Patented Jan. 3, 1967

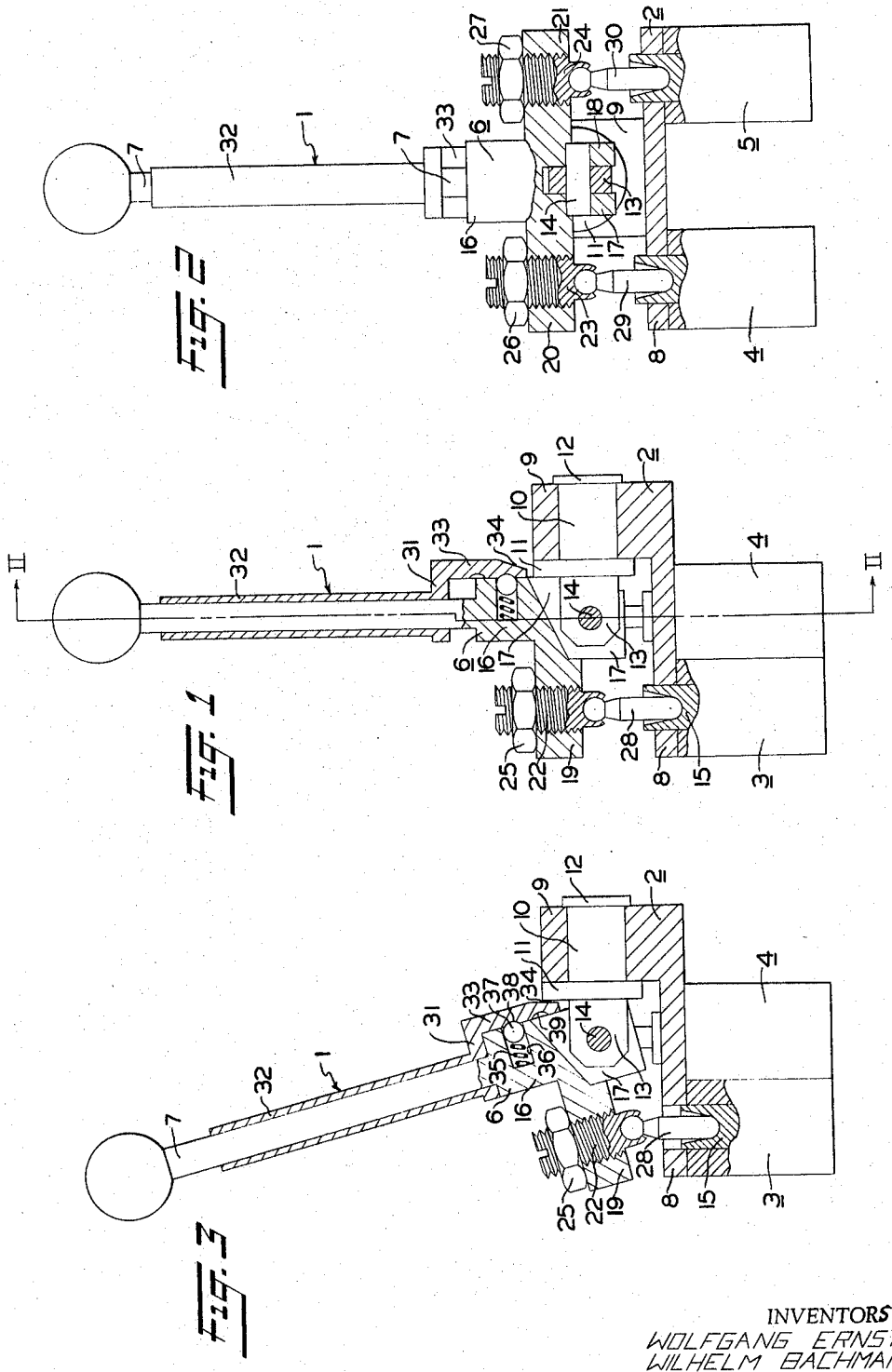

3,295,391
LOCKING MEANS FOR A LEVER-OPERATED
MULTI-POSITION VALVE DEVICE
Wolfgang Ernst, Neustadt am Rubenberge, Wilhelm Bachmann, Godshorn, Hannover, and Rudi Conradt, Hannover, Germany, assignors to Westinghouse Bremsen-Gesellschaft m.b.H., Hannover, Germany
Filed Sept. 21, 1964, Ser. No. 397,872
Claims priority, application Germany, Oct. 19, 1963, W 31,405
9 Claims. (Cl. 74—536)

This invention relates generally to lever-operated multi-position control valve devices and relates particularly to a means for releasably locking the lever in a preselected one of its valve operating positions.

Manually operable lever actuated multi-position valve devices of the type generally disclosed herein are frequently utilized for operating heavy machinery, such as excavators, oil drilling plants, and other related apparatus. For example, when used in an excavator, the lever is relatively movable about a pivot from a neutral position to different ones of a plurality of positions for selectively operating valve actuating means to effect raising or lowering movement of appropriate earth moving elements of the excavator, and for effecting movement of the excavator carriage from place to place. If it is desirable to move the excavator carriage a sufficient distance to a new location to require steering during such movement, the operator must divide his attention between the steering operation of the excavator carriage and the manual maintenance of the lever of the valve device in the carriage moving position.

Heretofore, it has been possible for the operator to lock the lever in a preselected one of a number of operating positions by rotating a handle threadedly sleeved on the lever to move a bearing edge on the handle coaxially along the lever into gripping engagement with a cover enclosing the lever mechanism itself. In this type of locking means, reverse rotation of the handle with respect to the lever releases the locking means.

It is an object of the present invention to provide in a manually operable lever actuated multi-position control valve device a simple, inexpensive, manually operable locking means for holding the lever in a preselected one of its positions to prevent movement thereof in response to normal jarring of the lever mechanism during operation of the excavator or similar device, the locking means operating automatically to unlock the lever in response to a lever return movement by the operator.

In the present invention, this is achieved by sleeving on the shaft of such a lever an axially movable bushing having at the lower end thereof a finger member or wedge operable in response to manual movement of the bushing axially in a first direction toward the shaft pivot to dispose the finger or shim or wedge in wedged relationship between the lever and the lever support when the lever is moved about its pivot to a predetermined position corresponding to the carriage moving position, thus providing a space for insertion of the wedge. A spring-loaded ball in the lever shaft mates with either one of two depressions axially spaced on the bushing to releasably lock the bushing in either a first position outwardly of the pivot end of the shaft to hold the wedge in the withdrawn lever releasing position, or in a second position inwardly of the shaft toward its pivot end thereof to lock the wedge or shim between the lever and its support to prevent relative movement therebetween. When force is applied to the lever to return the same to its neutral position after being locked in the selected one position by movement of the locking means, a component of the reactive force on the lever support acts axially on the bushing to urge the same axially outwardly of the shaft to release the ball from the first depression and slide the bushing away from the pivot to engage the ball in the first position as described above, thus releasing the lever for free operation.

These and other objects of the present invention will become more readily apparent when taken in conjunction with the following description and when taken in conjunction with the drawings, in which:

FIG. 1 is a side elevational view, taken partly in cross section, of a lever-operated multi-position control device having a lever locking mechanism thereon, showing the present invention;

FIG. 2 is a front elevational view of the valve operating device of FIG. 1, taken substantially along the line II—II of FIG. 1; and FIG. 3 is a side elevational view of the control device of FIG. 1 but showing the lever in one of its valve operating positions and showing the locking means in lock position.

Referring now to the drawings, and particularly to FIGS. 1 and 2 thereof, there is disclosed a multi-position valve device generally indicated at 1 and comprising a support bracket 2, a plurality of valve actuating devices 3, 4 and 5 disposed on said support, and a valve control device 6 pivotally connected to the support 2 and having a lever 7 attached thereto for pivotally moving the control device to selectively operate the valve devices 3, 4 and 5.

The support bracket 2 comprises a base plate member 8 to which the valve devices 3, 4 and 5 are attached in any suitable manner in the relatively spaced relationship shown, and an upright member 9 disposed on one side thereof, the latter supporting an axially rotatable shaft 10 journaled therethrough and axially fixed therein by a pair of spaced opposed flange members 11 and 12 straddling the upright member 9. The shaft 10 includes a flattened end portion 13 extending outwardly of the upright member 9 and horizontally over the base plate 8. A pivot pin 14 extends through the flattened end 13 perpendicularly to the axis of the shaft 10 for pivotally supporting the control device 6, as hereinafter described.

The actuating valves 3, 4 and 5 may be of any commercially available type suitable for controlling fluid flow under pressure to appropriate operating cylinders. Accordingly, except for the general illustration of a valve body and an axially movable member 15 for effecting operation of the valve devices, the details thereof are not shown since they form no part of the present invention.

The control device 6 comprises a cylindrical central portion 16 having the integral operating handle or shaft 7 extending coaxially upwardly thereon, and a pair of spaced arms 17, 18 forming a bifurcated lower end extending axially downwardly therefrom in straddling relationship with the flattened end 13 of shaft 10, and being suitably apertured to receive the pin 14 through the ends 17, 18, wherein the mutually perpendicular relationship between the pin 14 and shaft 10 comprises a universal joint connecting the central member 16 to the support 2. For actuating the valve actuators 15 of the valves 3, 4 and 5, three integral arm members 19, 20 and 21 extend radially and perpendicularly from the central cylindrical member 16, each including near its outer end a socket member 22, 23, 24 threadedly received in a through bore in the respective arms and being releasably lockable in any axial position by means of a nut 25, 26 and 27, respectively. A combined ball and rod member 28, 29, 30 is disposed for universal movement between each socket member 22, 23, 24 and the corresponding one of the valve actuators, so that movement of the shaft about either or both of the pivot pin 14 and shaft 10 for the control operation, as shown in FIGS. 1 and 2, effects a corresponding downward movement of a valve actuator 15 to effect operation of the corresponding valve device 3, 4 or 5, as the case may be.

If it is assumed that left and right movement of lever 7 about pivot 10 in FIG. 2 effects raising and lowering operations, respectively, of valves 4 and 5, respectively, and that in FIGS. 1 and 3 movement of the lever 7 effects operation of valve 3 as in FIG. 3 to effect movement of the carriage, it is desirable at times to lock the lever in the latter position so the operator may devote his attention to steering the carriage.

In accordance with the present invention, a releasable locking means 31 is provided on the handle 7 for locking the lever 7 in the carriage moving position, as shown in FIG. 3, and comprises a bushing 32 sleeved for reciprocal movement on the lever 7, including at the lower end thereof a laterally displaced finger member, shim or wedge 33 extending along a line paralleling the axis of the bushing and disposed in reciprocal sliding engagement with one side of the central portion 16 of the control device 6 as the bushing 32 is moved reciprocably on shaft 7.

When the bushing is disposed in the upper one of its two positions, as shown in FIG. 1, the shim or wedge 33 is disposed away from upright member 9 of the support 2, so as not to inhibit any of the above-described movements of lever 7 in operating the valves 3, 4 or 5. When the lever 7 is moved to the position shown in FIG. 3 to operate the carriage operating valve device 3, thus moving the central portion 16 of the control device away from the upright member 9 around the pivot pin 14, the operator may then manually effect downward movement of the bushing 32, thus sliding the finger or shim or wedge 33 along the side of central member 16 until the tapered outside edge 34 of the shim 33 engages the flange 11 as shown, thus wedging the lever 7 in the position shown in FIG. 3.

In order that the bushing 32 may be releasably locked in either one of the two above-described positions, a spring means, particularly a coil spring 35, is axially compressed in a bore 36 in central portion 16 to urge a ball member 37 out of said bore into engagement with the inside of finger 33, the latter including a pair of spaced depressions 38, 39 selectively engageable with the ball when the shim 33 is disposed in its upper or lower positions, respectively, as above described. Thus, when the lever 7 and bushing 32 are relatively positioned with respect to each other and the flange 11, as shown in FIG. 3, the ball engages the upper detent 38, thus locking the bushing 32 in position under the urging of spring 35 with enough force to prevent movement of the bushing upwardly on the lever, and thus in turn prevents movement of the lever in response to jarring of the main excavator carriage. Thereafter, the application of a lever return force to the lever 7 by the operator provides a reaction force by flange 11 on shim 33 having a component acting axially of the shim 33 sufficiently large to override the force of spring 35, whereupon the bushing 32 moves up the lever 7 until the depression 39 engages with the ball 37, thus locking the bushing and shim or wedge in the primary position, as shown in FIG. 1, to thus provide for uninhibited movement of lever 7 in its operation of valves 3, 4 and 5.

Having now described the invention, what we claim as new and desire to secure by Letters Patent, is:

1. A control device comprising:
 (a) a lever,
 (b) a support,
 (c) means pivotally attaching said lever to said support for selective movement to and from a plurality of positions relative to said support to effect a plurality of control operations,
 (d) a bushing disposed on said lever for coaxial reciprocable movement therewith,
 (e) shim means attached to said bushing and moveable therewith to and from a first position disposing the shim means in the space provided between the lever means and the support when the lever is placed in a preselected one of said positions to hold the lever means in said one position, and moveable to and from a second position disposing the shim means in a withdrawn position relative to said space for permitting uninhibited movement of the lever,
 (f) means releasably holding said shim means in each of said first and second positions and including means effecting a predetermined maximum force on said shim means to be overridden by an opposing manual force to effect release of said shim means from each of said first and second positions.

2. The control device, as recited in claim 1, in which said means releasably holding said shim means comprises a spring-loaded ball and corresponding depression means.

3. The control device, as recited in claim 2, in which said spring-loaded ball and depression means are carried by the lever and shim means.

4. The control device of claim 2, in which said means releasably holding said shim means comprises a spring-loaded ball in a bore in said lever cooperatively associated with a pair of spaced depression means on said shim means.

5. A control device comprising:
 (a) a lever,
 (b) a support,
 (c) means pivotally attaching said lever to said support for relative movement with respect thereto to and from a plurality of positions, a portion of said lever and a portion of said support forming an angle therebetween gradually increasing in size in the direction of a plane of movement of the lever as it moves from a first position to a second position, and gradually decreasing in size as the lever is moved from the second position to the first position,
 (d) shim means disposable in a first position between said portion of said lever and said portion of said support when the lever is disposed in said second position, and having a tapered portion having an included angle substantially equal to the angle between said lever portion and said support portion when the lever is in said second position whereupon the application of a force to move said lever from said second position to said first position applies a force expelling said shim from its first position to a second position away from between said support portion and said lever portion,
 (e) means holding said shim in its said first position with a force sufficient to prevent expulsion of said shim to its said second position in response to jarring force and less than a predetermined expulsion force as applied by the application of manual force to move said lever from said second position to said first position.

6. The control device, as recited in claim 5, further characterized in that holding means are provided for releasably locking said shim means in said second shim position with a force less than that of a predetermined manual force applied to move said shim means from said second shim position to said first shim position.

7. The control device, as recited in claim 6, further characterized in that said holding means comprises spring-loaded ball and corresponding depression means.

8. The control device, as recited in claim 7, further characterized in that said shim means is attached to said lever means for axial reciprocable movement with respect thereto to effect insertion of and removal of said shim portion from between said portion of said lever and said portion of said support.

9. A control device comprising:
 (a) a lever means, (b) a support means,
(c) means pivotally attaching said lever to said support means for selective movement to and from a plurality of positions relative to said support to effect a plurality of control operations, and
(d) means for releasably locking said lever means in a preselected one of said plurality of positions comprising:
   (i) shim means carried by said lever and reciprocably movable longitudinaly with respect thereto for removable disposition in the space provided between the lever means and said support means when the lever is moved to a preselected one of said plurality of positions from a second of said plurality of positions, and
   (ii) means applying a predetermined force for holding said shim means in said space until said force is overridden by a predetermined opposing force applied incidental to manual movement of the lever from said second position to said one position.

References Cited by the Examiner
UNITED STATES PATENTS 1,478,275  12/1923  Conklin et al. _____ 70—206
1,998,972   4/1935  Snell _____ 74—536

FRED C. MATTERN, Jr., *Primary Examiner.*

J. D. PUFFER, *Assistant Examiner.*